United States Patent [19]

Swan

[11] 4,427,533
[45] Jan. 24, 1984

[54] CATALYTIC REFORMING PROCESS

[75] Inventor: George A. Swan, Baton Rouge, La.

[73] Assignee: Exxon Research and Engineering Co., Florham Park, N.J.

[21] Appl. No.: 482,508

[22] Filed: Apr. 6, 1983

Related U.S. Application Data

[63] Continuation-in-part of Ser. No. 82,804, Oct. 9, 1979.

[51] Int. Cl.$^3$ ............................................. C10G 35/06
[52] U.S. Cl. ......................................... 208/65; 208/64
[58] Field of Search ...................... 208/65, 64, 138, 139

[56] References Cited

U.S. PATENT DOCUMENTS

| | | | |
|---|---|---|---|
| 3,415,737 | 12/1968 | Kluksdahl | 208/138 |
| 3,516,924 | 6/1970 | Forbes | 208/65 |
| 3,544,451 | 12/1970 | Mitsche et al. | 208/138 |
| 3,660,271 | 5/1972 | Keith et al. | 208/65 |
| 3,705,094 | 12/1972 | Keith et al. | 208/65 |
| 3,943,050 | 3/1976 | Bertolacini | 208/65 |
| 4,155,834 | 5/1979 | Gallagher | 208/65 |
| 4,167,473 | 9/1979 | Sikonia | 208/64 |
| 4,174,270 | 11/1979 | Mayes | 208/64 |
| 4,356,081 | 10/1982 | Gallagher et al. | 208/139 |

FOREIGN PATENT DOCUMENTS 27384  4/1981  European Pat. Off. .

*Primary Examiner*—Curtis R. Davis
*Attorney, Agent, or Firm*—Llewellyn A. Proctor

[57] ABSTRACT

A process wherein, in a series of reforming zones, or reactors, each of which contains a bed, or beds of catalyst, the catalyst in the leading reforming zones is constituted of supported platinum and a relatively low concentration of rhenium, and the catalyst in the last reforming zone, or reactor of the series, is constituted of platinum and a relatively high concentration of rhenium. The amount of rhenium relative to the platinum in the last reforming zone, or reactor is present in an atomic or weight ratio of rhenium:platinum of at least 1.5:1; preferably at least about 2:1, and more preferably ranges from about 2:1 to about 3:1. The beds of catalyst are contacted with a hydrocarbon or naphtha feed, and hydrogen, at reforming conditions to produce a hydrocarbon, or naphtha product of improved octane, and the product is withdrawn.

14 Claims, No Drawings

CATALYTIC REFORMING PROCESS

RELATED APPLICATIONS

This is a continuation-in-part of Application Ser. No. 082,804, filed Oct. 9, 1979. This application, particularly page 9, lines 7–23, and pages 19–21, are herewith incorporated by reference.

BACKGROUND OF THE INVENTION AND PRIOR ART

Catalytic reforming, or hydroforming, is a well established industrial process employed by the petroleum industry for improving the octane quality of naphthas or straight run gasolines. In reforming, a multi-functional catalyst is employed which contains a metal hydrogenation-dehydrogenation (hydrogen transfer) component, or components, substantially atomically dispersed upon the surface of a porous, inorganic oxide support, notably alumina. Noble metal catalysts, notably of the platinum type, are currently employed, reforming being defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics; isomerization of n-paraffins; isomerization of alkylcycloparaffins to yield cyclohexanes; isomerization of substituted aromatics; and hydrocracking of paraffins which produces gas, and inevitably coke, the latter being deposited on the catalyst.

Platinum has been widely commercially used in recent years in the production of reforming catalysts, and platinum-on-alumina catalysts have been commercially employed in refineries for the last few decades. In the last decade, additional metallic components have been added to platinum as promoters to further improve the activity or selectivity, or both, of the basic platinum catalyst, e.g. iridium, rhenium, tin, and the like. Some catalysts possess superior activity, or selectivity, or both, as contrasted with other catalysts. Platinum-rhenium catalysts by way of example possess admirable selectivity as contrasted with platinum catalysts, selectivity being defined as the ability of the catalyst to produce high yields of $C_5+$ liquid products with concurrent low production of normally gaseous hydrocarbons, i.e., methane and other gaseous hydrocarbons, and coke.

In a reforming operation, one or a series of reactors, or a series of reaction zones, are employed. Typically, a series of reactors are employed, e.g., three or four reactors, these constituting the heart of the reforming unit. Each reforming reactor is generally provided with a fixed bed, or beds, of the catalyst which receive downflow feed, and each is provided with a preheater or interstage heater, because the reactions which take place are endothermic. A naphtha feed, with hydrogen, or recycle hydrogen gas, is currently passed through a preheat furnace and reactor, and then in sequence through subsequent interstage heaters and reactors of the series. The product from the last reactor is separated into a liquid fraction, and a vaporous effluent. The former is recovered as a $C_5+$ liquid product. The latter is a gas rich in hydrogen, and usually contains small amounts of normally gaseous hydrocarbons, from which hydrogen is separated and recycled to the process to minimize coke production.

The sum-total of the reforming reactions, supra, occurs as a continuum between the first and last reactor of the series, i.e., as the feed enters and passes over the first fixed catalyst bed of the first reactor and exits from the last fixed catalyst bed of the last reactor of the series. The reactions which predominate between the several reactors differ dependent principally upon the nature of the feed, and the temperature employed within the individual reactors. In the initial reaction zone, or first reactor, which is maintained at a relatively low temperature, it is believed that the primary reaction involves the dehydrogenation of naphthenes to produce aromatics. The isomerization of naphthenes, notably $C_5$ and $C_6$ naphthenes, also occurs to a considerable extent. Most of the other reforming reactions also occur, but only to a lesser, or smaller extent. There is relatively little hydrocracking, and very little olefin or paraffin dehydrocyclization occurs in the first reactor. Within the intermediate reactor zone(s), or reactor(s), the temperature is maintained somewhat higher than in the first, or lead reactor of the series, and it is believed that the primary reactions in the intermediate reactor, or reactors, involve the isomerization of naphthenes and paraffins. Where, e.g., there are two reactors disposed between the first and last reactor of the series, it is believed that the principal reaction involves the isomerization of naphthalenes, normal paraffins and isoparaffins. Some dehydrogenation of naphthenes may, and usually does occur, at least within the first of the intermediate reactors. There is usually some hydrocracking, at least more than in the lead reactor of the series, and there is more olefin and paraffin dehydrocyclization. The third reactor of the series, or second intermediate reactor, is generally operated at a somewhat higher temperature than the second reactor of the series. It is believed that the naphthene and paraffin isomerization reactions continue as the primary reaction in this reactor, but there is very little naphthene dehydrogenation. There is a further increase in paraffin dehydrocyclization, and more hydrocracking. In the final reaction zone, or final reactor, which is operated at the highest temperature of the series, it is believed that paraffin dehydrocyclization, particularly the dehydrocyclization of the short chain, notably $C_6$ and $C_7$ paraffins, is the primary reaction. The isomerization reactions continue, and there is more hydrocracking in this reactor than in any of the other reactors of the series.

The activity of the catalyst gradually declines due to the build-up of coke. Coke formation is believed to result from the deposition of coke precursors such as anthracene, coronene, ovalene, and other condensed ring aromatic molecules on the catalyst, these polymerizing to form coke. During operation, the temperature of the process is gradually raised to compensate for the activity loss caused by the coke deposition. Eventually, however, economics dictate the necessity of reactivating the catalyst. Consequently, in all processes of this type the catalyst must necessarily be periodically regenerated by burning off the coke at controlled conditions.

Two major types of reforming are generally practiced in the multi reactor units, both of which necessitate periodic reactivation of the catalyst, the initial sequence of which requires regeneration, i.e., burning the coke from the catalyst. Reactivation of the catalyst is then completed in a sequence of steps wherein the agglomerated metal hydrogenation-dehydrogenation components are atomically redispersed. In the semi-regenerative process, a process of the first type, the entire unit is operated by gradually and progressively increasing the temperature to maintain the activity of the catalyst caused by the coke deposition, until finally the entire unit is shut down for regeneration, and reactivation, of the catalyst. In the second, or cyclic type of process, the reactors are individually isolated, or in effect swung out of line by various manifolding arrangements, motor operated valving and the like. The catalyst is regenerated to remove the coke deposits, and then reactivated while the other reactors of the series remain on stream. A "swing reactor" temporarily replaces a reactor which is removed from the series for regeneration and reactivation of the catalyst, until it is put back in series.

Various improvements have been made in such processes to improve the performance of reforming catalysts in order to reduce capital investment or improve $C_5^+$ liquid yields while improving the octane quality of naphthas and straight run gasolines. New catalysts have been developed, old catalysts have been modified, and process conditions have been altered in attempts to optimize the catalytic contribution of each charge of catalyst relative to a selected performance objective. Nonetheless, while any good commercial reforming catalyst must possess good activity, activity maintenance and selectivity to some degree, no catalyst can possess even one, much less all of these properties to the ultimate degree. Thus, one catalyst may possess relatively high activity, and relatively low selectivity and vice versa. Another may possess good selectivity, but its selectivity may be relatively low as regards another catalyst. Platinum-rhenium catalysts, among the handful of successful commercially known catalysts, maintain a rank of eminence as regards their selectivity; and they have good activity. Nonetheless, the existing world-wide shortage in the supply of high octane naphtha persists and there is little likelihood that this shortage will soon be in balance with demand. Consequently, a relatively small increase in the $C_5^+$ liquid yield can represent a large credit in a commercial reforming operation.

Variations have been made in the amount, and kind of catalysts charged to the different reforming reactors of a series to modify or change the nature of the product, or to improve $C_5^+$ liquid yield. In, e.g., U.S. Pat. No. 2,654,694 there is described a process wherein the chloride content of the catalyst is increased in amount in the tail reactor, as contrasted with the lead reactor, to promote hydrocracking. The catalyst composition is otherwise unchanged. In U.S. Pat. No. 2,902,426 besides providing different amounts of catalyst in the several reactors of the series the catalyst in the lead reactor, or reactors, is neutral while the catalyst in the tail reactor, or reactors, is acidified by the addition of halogen to the catalyst. In accordance with U.S. Pat. No. 3,007,862 the catalyst charge to the lead reactor is from 1.1 to 3 times the amount of catalyst charged to the next reactor. And, in U.S. Pat. No. 3,024,186, besides providing different amounts of catalyst in the several reactors of the series only fresh catalyst is employed in the lead reactors, which contains catalysts that may be neutral or acidic, and the catalyst in subsequent reactors, which is always neutral, is regenerated and reused. Illustrative of various other patents which show variations in the catalyst acidity in the different reactors or differences in the halogen content are e.g., U.S. Pat. Nos. 2,659,692; 2,664,386; 2,739,927; 2,885,345; 2,933,446; 3,024,186; 3,117,073; 3,287,253; 3,669,876 and 4,049,539.

Different catalysts, with differing catalytic metal components, have also been used in the different reactors of a series as illustrated, e.g., by U.S. Pat. No. 2,758,062; U.S. Pat. Nos. 2,849,376; 2,890,163; British Pat. No. 820,403; U.S. Pat. No. 2,935,459; U.S. Pat. No. 3,033,777; U.S. Pat. No. 3,198,728; U.S. Pat. No. 3,684,693; U.S. Pat. No. 3,729,408 and U.S. Pat. No. 3,769,201. And various other compositional differences are represented by such patents as U.S. Pat. No. 2,902,426, supra; U.S. Pat. No. 2,908,628; U.S. Pat. No. 3,117,073; U.S. Pat. No. 3,287,253; U.S. Pat. No. 3,375,190; U.S. Pat. No. 3,424,669; U.S. Pat. No. 3,436,335; U.S. Pat. No. 3,679,575; U.S. Pat. No. 3,684,692 and U.S. Pat. No. 3,707,460. U.S. Pat. No. 3,684,692 employs platinum-rhenium catalysts in the various reactors, the lead reactors employing a neutral alumina support whereas the tail reactors employ an acidic oxide support for dehydrocyclization. The acidic support contains 90% alumina and 10% H-exchanged synthetic faujasite; and, both catalysts are chlorided.

In U.S. Pat. No. 3,660,271 to Keith et al there is described a process for the catalytic reforming of naphthene and paraffin-containing hydrocarbons for providing a product of improved octane. The first reactor, or reactors, of the series contains a supported platinum-group metal containing low acidity catalyst which is devoid, or essentially devoid or rhenium, i.e., contains less than about 0.05 wt. %, preferably less than 0.01 wt. % or no detectable amount of rhenium, which serves to dehydrogenate naphthenes. The tail reactor, or reactors, and preferably the last reactor of the series contains a supported platinum group metal and rhenium containing catalyst of higher acidity which serves to dehydrocyclize paraffins. An example describes a four reactor system in which a chlorided platinum metal catalyst (0.6% Pt/0.7% Cl/Al$_2$O$_3$) is employed in the first three reactors of the series, and a chlorided platinum-rhenium catalyst (0.6% Pt/0.6% Re/10.7% Cl/90% Al$_2$O$_3$/10% H-faujasite) is employed in the last reactor of the series. U.S. Pat. No. 3,705,095 to M. H. Dalson et al is quite similar to the Keith et al patent except that the catalysts charged into the several reactors are supported on alumina. In U.S. Pat. No. 3,658,691 and U.S. Pat. No. 3,705,094, both to Keith et all, the rhenium-containing catalyst is employed in the lead reactors of the series. In the former there is thus described a process wherein a platinum-rhenium-chloride/acidic oxide catalyst is employed in the initial dehydrogenation reactor, and a platinum-chloride/alumina catalyst is employed in the dehydrocyclization tail reactor; and in the latter, platinum-rhenium-chloride/alumina is employed in the first three reactors and a platinum-chloride/alumina catalyst is employed in last reactor of the series. In British Pat. No. 1,470,887 a platinum-rhenium catalyst is also employed in the early stages, and a platinum-iridium catalyst is employed in the tail reactor.

Whereas these variations, and modifications have generally resulted in improving the process with respect to some selected performance objective, or another, it is nonetheless desirable to provide a new and improved process which is capable of achieving higher conversions of the product to $C_5^+$ liquid naphthas as contrasted with present reforming operations.

This object and others are achieved in accordance with the present invention, embodying a process wherein, in a series of reforming zones, or reactors, each of which contains a bed, or beds of catalyst, the catalyst in the leading reforming zones, or reactors, is constituted of supported platinum and a relatively low concentration of rhenium, and the catalyst in the last reforming zone, or reactor of the series, is constituted of platinum and a relatively high concentration of rhenium, the amount of rhenium relative to the platinum in the last reforming zone, or reactor, being present in an atomic, or weight ratio of at least about 1.5:1 and higher, and preferably the atomic ratio of rhenium:platinum ranges at least about 2:1, and higher, and more preferably from about 2:1 to about 3:1. The beds of catalysts are contacted with a hydrocarbon or naphtha feed, and hydrogen, at reforming conditions to produce a hydrocarbon, or naphtha product of improved octane, and the product is withdrawn. Note that the molecular weights of platinum and rhenium are practically the same (195 vs. 186, respectively). Thus the atomic ratio will be substantially the same as the weight ratio which may be more convenient to use. (The examples employed herein utilize weight ratios.)

The present invention requires the use of a high rhenium, platinum-rhenium catalyst within the reforming zone wherein the primary, or predominant reaction involves the dehydrocyclization of paraffins, and olefins. Within this, the paraffin dehydrocyclization zone, there is employed a platinum-rhenium catalyst which contains rhenium in concentration sufficient to provide an atomic, or weight ratio of rhenium:platinum of at least about 1.5:1, and higher, preferably at least about 2:1, and higher, and more preferably from about 2:1 to about 3:1. The paraffin dehydrocyclization zone, where a series of reactors constitute the reforming unit, is invariably found in the last reactor, or final reactor of the series. Of course, where there is only a single reactor, quite obviously the paraffin dehydrocyclization reaction will predominate in the catalyst bed, or beds defining the zone located at the product exit side of the reactor. Where there are multiple reactors, quite obviously the paraffin dehydrocyclization reaction will predominate in the catalyst bed, or beds defining a zone located at the product exit side of the last reactor of the series. Often the paraffin dehydrocylization reaction is predominant of the sum-total of the reactions which occur within the catalyst bed, or beds constituting the last reactor of the series dependent upon the temperature and amount of catalyst that is employed in the final reactor vis-a-vis the total catalyst contained in the several reactors, and temperatures maintained in the other reactors of the reforming unit.

In its preferred aspects, a low rhenium platinum-rhenium catalyst is employed in the reforming zones in front of, or in advance of the paraffins dehydrocyclization zone, viz., the naphthene dehydrogenation zone, or zones, and the isomerization zone, or zones. Suitably, the leading reforming zones, or reactors of the series are provided with platinum-rhenium catalyst wherein the atomic, or weight ratio of the rhenium:platinum ranges from about 0.1:1 to about 1:1. Catalyst having a platinum-rhenium atomic or weight ratio as high as 1.2:1 may be employed, but preferably the ratio ranges from about 0.3:1 to about 1:1, and the last reforming zone, or reactor of the series is provided with a platinum-rhenium catalyst wherein the atomic, or weight ratio of the rhenium:platinum ranges from about 1.5:1 to about 3:1, and preferably from about 2:1 to about 3:1.

It is known that the amount of coke produced in an operating run increases progressively from a leading reactor to a subsequent, or from the first reactor to the last, or tail reactor of the series as a consequence of the different types of reactions that predominate in the several different reactors. Thus, in the first reactor of the series the metal site, or hydrogenation-dehydrogenation component of the catalyst, plays a dominant role and the predominant reaction involves the dehydrogenation of naphthenes to aromatics. This reaction proceeds at relatively low temperature, and the coke formation is relatively low. In an intermediate reactor, or reactors (usually a second and third reactor), on the other hand, the acid site plays a major role and the isomerization reactions predominate, though additional naphthenes are formed and these are dehydrogenated to aromatics as in the first reactor. In both of the intermediate reactors the temperature is maintained higher than in the first reactor, and the temperature in the third reactor is maintained higher than that of the second reactor of the series. Carbon formation is higher in these reactors than in the first reactor of the series, and coke is higher in the third reactor than in the second reactor of the series. The chief reaction in the last reaction zone, or tail reactor of the series involves dehydrocyclization of paraffins and olefins, and the highest temperature is employed in this reactor. Coke formation is highest in this reactor, and the reaction is often the most difficult to control. It is also generally known that these increased levels of coke in the several reactors of the series causes considerable deactivation of the catalysts. Whereas the relationship between coke formation, and rhenium promotion to increase catalyst selectivity is not known with any degree of certainty because of the extreme complexity of these reactions, it is believed that the presence of the rhenium minimizes the adverse consequences of the increased coke levels, albeit it does not appear to minimize coke formation in any absolute sense. Nonetheless, in accordance with this invention, the concentration of the rhenium is increased in those reactors where coke formation is the greatest, but most particularly in the last reaction zone, or reactor of the series. Thus, in one of its forms the catalysts within the series of reactors are progressively staged with respect to the rhenium concentration, the rhenium concentration being increased from the first to the last reaction zone, or reactor of the series such that the rhenium content of the platinum-rhenium catalysts is varied significantly to counteract the normal effects of coking.

In one of its aspects, optimum utilization of rhenium-promoted platinum catalysts is obtained by providing the catalyst of the initial, or first reactor of the series with rhenium in concentration adequate to provide an atomic or weight ratio of rhenium:platinum ranging from about 0.1:1 to about 0.5:1, preferably from about 0.3:1 to about 0.5:1. The catalyst of the intermediate reforming zones, as represented by the reactors intermediate between the first and last reactors of the series, are provided with rhenium in concentration adequate to provide an atomic or weight ratio of rhenium:platinum ranging from about 0.5:1 to about 1.2:1, preferably above about 0.5:1 to about 0.8:1. The last reactor of the series is provided with rhenium in concentration adequate to provide an atomic or weight ratio of rhenium:platinum from about 1.5:1 to about 3:1, preferably from about 2:1 to about 3:1. The last reactor of a series, whether the series contains less than three or more than three reactors, is always provided with a catalyst which contains an atomic or weight ratio of rhenium:platinum of at least 1.5:1, and preferably the catalyst contains an atomic or weight ratio of rhenium:platinum ranging from about 2:1 to about 3:1.

The catalyst employed in accordance with this invention is necessarily constituted of composite particles which contain, besides a carrier or support material, a hydrogenation-dehydrogenation component, or components, a halide component and, preferably, the catalyst is sulfided. The support material is constituted of a porous, refractory inorganic oxide, particularly alumina. The support can contain, e.g., one or more of alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 2 percent, based on the weight of the support. A preferred support for the practice of the present invention is one having a surface area of more than 50 m$^2$/g, preferably from about 100 to about 300 m$^2$/g, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 30 to 300 Å.

The metal hydrogenation-dehydrogenation component can be composited with or otherwise intimately associated with the porous inorganic oxide support or carrier by various techniques known to the art such as ion-exchange, coprecipitation with the alumina in the sol or gel form, and the like. For example, the catalyst composite can be formed by adding together suitable reagents such as a salt of platinum and ammonium hydroxide or carbonate, and a salt of aluminum such as aluminum chloride or aluminum sulfate to form aluminum hydroxide. The aluminum hydroxide containing the salts of platinum can then be heated, dried, formed into pellets or extruded, and then calcined in nitrogen or other non-agglomerating atmosphere. The metal hydrogenation components can also be added to the catalyst by impregnation, typically via an "incipient wetness" technique which requires a minimum of solution so that the total solution is absorbed, initially or after some evaporation.

It is preferred to deposit the platinum and rhenium metals, and additional metals used as promoters, if any, on a previously pilled, pelleted, beaded, extruded, or sieved particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent filtration or evaporation to effect total uptake of the metallic components.

Platinum in absolute amount is usually supported on the carrier within the range of from about 0.01 to 3 percent, preferably from about 0.05 to 1 percent, based on the weight of the catalyst (dry basis). Rhenium, in absolute amount, is also usually supported on the carrier in concentration ranging from about 0.1 to about 3 percent, preferably from about 0.5 to about 1 percent, based on the weight of the catalyst (dry basis). The absolute concentration of each, of course, is preselected to provide the desired ratio of rhenium:platinum for a respective reactor of the unit, as heretofore expressed.

In compositing the metals with the carrier, essentially any soluble compound can be used, but a soluble compound which can be easily subjected to thermal decomposition and reduction is preferred, for example, inorganic salts such as halide, nitrate, inorganic complex compounds, or organic salts such as the complex salt of acetylacetone, amine salt, and the like. Where, e.g., platinum is to be deposited on the carrier, platinum chloride, platinum nitrate, chloroplatinic acid, ammonium chloroplatinate, potassium chloro platinate, platinum polyamine, platinum acetylacetonate, and the like, are preferably used. A promoter metal, or metal other than platinum and rhenium, when employed, is added in concentration ranging from about 0.01 to 3 percent, preferably from about 0.05 to about 1 percent, based on the weight of the catalyst (dry basis).

In preparing catalysts, the metals are deposited from solution on the carrier in preselected amounts to provide the desired absolute amount, and weight ratio of each respective metal. Albeit the solution, or solutions, may be prepared to nominally contain the required amounts of metals with a high degree of precision, as is well known, chemical analysis will show that the finally prepared catalyst, or catalyst charged into a reactor, will generally deviate negatively or positively with respect to the preselected nominal values. In general however, where, e.g., the final catalyst is to contain 0.3 wt. % platinum and 0.7 wt. % rhenium the preparation can be controlled to provide with in a 95% confidence level a range of ±0.03 wt. % platinum and ±0.05 wt. % rhenium. Or where, e.g., the final catalyst is to contain 0.3 wt. % platinum and 0.3 weight percent rhenium, the preparation can be controlled to provide within a 95% confidence level a range ±0.03 wt. % platinum and ±0.03 wt. % rhenium. Thus, a catalyst nominally containing 0.3 wt. % platinum and 0.7 wt. % rhenium is for practical purposes the equivalent of one which contains 0.3±0.03 wt. % platinum and 0.7±0.05 wt. % rhenium, and one which contains 0.3±0.03 wt. % platinum and 0.3±0.05 wt. % rhenium, respectively.

To enhance catalyst performance in reforming operations, it is also required to add a halogen component to the catalysts, fluorine and chlorine being preferred halogen components. The halogen is contained on the catalyst within the range of 0.1 to 3 percent, preferably within the range of about 0.9 to about 1.5 percent, based on the weight of the catalyst. When using chlorine as halogen component, it is added to the catalyst within the range of about 0.2 to 2 percent, preferably within the range of about 1 to 1.5 percent, based on the weight of the catalyst. The introduction of halogen into catalyst can be carried out by any method at any time. It can be added to the catalyst during catalyst preparation, for example, prior to, following or simultaneously with the incorporation of the metal hydrogenation-dehydrogenation component, or components. It can also be introduced by contacting a carrier material in a vapor phase or liquid phase with a halogen compound such as hydrogen fluoride, hydrogen chloride, ammonium chloride, or the like.

The catalyst is dried by heating at a temperature above about 80° F., preferably between about 150° F. and 300° F., in the presence of nitrogen or oxygen, or both, in an air stream or under vacuum. The catalyst is calcined at a temperature between about 500° F. to 1200° F., preferably about 500° F. to 1000° F., either in the presence of oxygen in an air stream or in the presence of an inert gas such as nitrogen.

Sulfur is a highly preferred component of the catalysts, the sulfur content of the catalyst generally ranging to about 0.2 percent, preferably from about 0.05 percent to about 0.15 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at temperatures ranging from about 350° F. to about 1050° F. and at pressures ranging from about 1 to about 40 atmospheres for the time necessary to achieve breakthrough, or the desired sulfur level.

The feed or charge stock can be a virgin naphtha cracked naphtha, a naphtha from a coil liquefaction process, a Fischer-Tropsch naphtha, or the like. Such feeds can contain sulfur or nitrogen, or both, at fairly high levels. Typical feeds are those hydrocarbons containing from about 5 to 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 15 to about 80 vol. % paraffins, both normal and branched, which fall in the range of about $C_5$ to $C_{12}$, from about 10 to 80 vol. % of naphthenes falling within the range of from about $C_6$ to $C_{12}$, and from 5 through 20 vol. % of the desirable aromatics falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
|---|---|---|
| Pressure, psig | 50–750 | 100–500 |
| Reactor Temp., °F. | 800–1200 | 850–1050 |
| Recycle Gas Rate, SCF/B | 1000–10,000 | 1500–5000 |
| Feed Rate, W/Hr/W | 0.5–10 | 1–5 |

The invention will be more fully understood by reference to the following comparative data illustrating its more salient featues. All parts are given in terms of weight except as otherwise specified.

A series of platinum-rhenium catalyst of high rhenium content were prepared for demonstrative purposes from portions of particulate alumina of the type conventionally used in the manufacture of commercial reforming catalysts. These portions of alumina, i.e., 1/16 inch diameter extrudates, were calcined for 3 hours at 1000° F. followed by equilibration with water vapor for 16 hours. Impregnation of metals upon the supports in each instance was achieved by adding $H_2PtCl_6$, $HReO_4$, and HCl in aqueous solution, while carbon dioxide was added as an impregnation aid. After a two hour equilibration, a mixture was filtered, dried, and then placed in a vacuum oven at 150° C. for a 16 hour period.

Prior to naphtha reforming, the catalyst was heated to 950° F. in 6% $O_2$ (94% $N_2$), and then soaked in $Cl_2/O_2$ (500 ppm $Cl_2$, 6% $O_2$, 5000 ppm $H_2O$) for one hour. Following 3 hours in 6% $O_2$ at 950° F., the catalyst was cooled to 850° F., reduced with 1.5% $H_2$ in $N_2$, and then presulfided with $H_2S$ in this reducing gas to achieve the desired catalyst sulfur level.

The platinum-rhenium catalysts employed in other than the tail reactor were conventional, and were obtained already made from a catalyst manufacturer. However, these catalysts are made in similar manner with the catalysts employed in other than the tail reactor.

Inspections on the feed employed in the tests are given in Table I.

TABLE I

|  | Lt. Arabian Virgin Naphtha | Persian Gulf Paraffinic Naphtha |
|---|---|---|
| API Gravity | 59.7 | 58.9 |
| Sulfur, wppm | 0.5 | 0.5 |
| Nitrogen, wppm | <0.1 | <0.1 |
| Bromine No., cg/g | 0.12 | 0.1 |
| ASTM Distillation |  |  |
| IBP °F. | 180 | 166 |
| 5% | 213 | 203 |
| 10 | 219 | 214 |
| 20 | 232 | 227 |
| 30 | 242 | 239 |
| 40 | 255 | 253 |
| 50 | 267 | 269 |
| 60 | 278 | 283 |
| 70 | 294 | 299 |
| 80 | 308 | 315 |
| 90 | 324 | 333 |
| 95 | 336 | 346 |
| FBP | 382 | 358 |

DEMONSTRATION

In a first cyclic simulation reforming run (Run 1), a high rhenium, catalyst containing nominally, with respect to metals, 0.3% Pt/0.67% Re/1.1% Cl/0.15% S for use in the several reactors of a four reactor unit, with all four reactors on-stream, was prepared as previously described. In a second run (Run 2) all of the reactors of the series were provided with low rhenium catalysts containing nominally, with respect to metals, 0.3% Pt/0.3% Re/1.0% Cl/0.06% S. The runs were conducted by passing the Light Arabian paraffinic naphtha through the series of reactors at 950° F. E.I.T., 175 psig, 3000 SCF/B which are the conditions necessary to produce a 102.0 RONC product. The results given in Table II were obtained, to wit:

TABLE II

|  | Catalyst Activity Units | Yield $C_5^+$ LV % |
|---|---|---|
| Run 1 (high rhenium) | 96.0 | 69.3 |
| Run 2 (low rhenium) | 102.0 | 72.0 |

These data thus show that the use of the high rhenium catalysts in the several reactors of the series considerably decreased the $C_5^+$ liquid yield, and octane number. This is believed due to the "cracking out" of aromatics precursors in the lead reactors. This conclusion is supported too by the 20 percent increase in light petroleum gases, principally $C_3$ and $C_4$ hydrocarbon, produced with the high rhenium catalysts.

EXAMPLE 1

A third run (Run 3) was conducted under similar conditions as the Demonstration with the same feed except that the three lead reactors were charged with the low rhenium catalysts, and the tail reactor only was charged with the high rhenium catalyst (28 wt. % of the total catalyst charge). The results which are compared with the preceding "low rhenium" run, are given in Table III.

TABLE III

|  |  | Catalyst Activity Units | Yield $C_5^+$ LV % |
|---|---|---|---|
| Run 2 | (low rhenium) | 102.0 | 72.0 |
| Run 3 | (low rhenium lead/high rhenium tail reactor) | 102.0 | 72.5 |

A $C_5^+$ liquid yield credit is thus obtained by staging the low and high rhenium catalysts as described. The $C_5^+$ liquid yield credit is further confirmed by the increase in recycle gas hydrogen purity (~1%) for the staged reactor system.

EXAMPLE 2

In a fourth run (Run 4), a dry, calcined catalyst containing nominally, with respect to metals, 0.29% Pt/0.72% Re/1.1% Cl/0.14% S was charged to the fourth, or tail reactor of a unit, and the first three reactors were charged with the low rhenium catalyst. This run was conducted with a more difficult to reform Persian Gulf Paraffinic naphtha at 950° F. E.I.T., 175 psig, 3000 SCF/B, at space velocity sufficient to produce a 100 RON product. This run is compared to a fifth run (Run 5) conducted at identical conditions with low rhenium catalyst in all four of the reactors, as given in Table IV.

TABLE IV

|  |  | Catalyst Activity Units | Yield $C_5^+$ LV % |
|---|---|---|---|
| Run 4 | (low rhenium lead/high rhenium tail reactor) | 92.0 | 75.5 |
| Run 5 | (low rhenium) | 77.0 | 74.3 |

The improvement in catalyst activity, and yield is thus manifest. In addition to the improved activity, and high yield advantage utilizing the more difficult feed stock, the run utilizing the high rhenium catalyst in the tail reactor also demonstrates a far greater coke tolerance than the conventional run even at high severity conditions (972° F. EIT) in the tail reactor, as shown by the data of Table V.

TABLE V

|  |  | Mole % $H_2$ in Recycle Gas | $H_2$ Yield Wt. % on on Feed | $C_1-C_4$ Yield Wt. % on Feed |
|---|---|---|---|---|
| Run 4 | (low rhenium lead/high rhenium tail reactor) | 77.1 | 2.31 | 17.86 |
| Run 5 | (low rhenium) | 76.2 | 2.26 | 18.82 |

EXAMPLE 3

Two additional runs were made (Runs 6 and 7) each over a period of four and one-half hours at similar conditions with a model feed, for comparative purposes, in a single reactor. The upper portion of the reactor in each run was charged with catalysts of different composition, analyzed as follows, to wit:

|  | Catalyst A | Catalyst B |
|---|---|---|
| Wt. % Pt | 0.27 | 0.32 |
| Wt. % Re | 0.33 | 0.29 |
| Wt. % Chloride | 0.88 | 0.95 |
| Wt. % Sulfur | 0.10 | 0.07 |
| Wt. Ratio Re:Pt | 1.2:1 | 0.91:1 |

In each run the upper portion of the reactor was provided with 62.5 percent by weight of the total catalyst charge to the reactor of Catalyst A and Catalyst B, respectively. The remaining lower portion of the reactor in each run (containing 37.5 wt. percent of the total catalyst), respectively, was charged with a high rhenium, platinum-rhenium catalyst, Catalyst C, of composition which analyzed as follows, to wit:

|  | Catalyst C |
|---|---|
| Wt. % Pt | 0.29 |
| Wt. % Re | 0.66 |
| Wt. % Chloride | 0.98 |
| Wt. % Sulfur | 0.11 |
| Wt. ratio Re:Pt | 2.28:1 |

In each run n-heptane, with hydrogen, was passed cocurrently downwardly over the catalyst at the following conditions

| Pressure, psig | 100 |
|---|---|
| Reactor temperature, °F. | 932 |
| Hydrogen Gas Rate, SCF/B | 5000 |
| Feed Rate, W/Hr/W | 10 | with the following results, to wit:

| | $C_5+$ Liquid Yield Hours on Oil | | | | | | | |
|---|---|---|---|---|---|---|---|---|
|  | 1.5 | 2.0 | 2.5 | 3.0 | 3.5 | 4 | 4.5 | Avg. |
| Run 6 Catalyst A/ Catalyst C | 80.5 | 78.5 | 80.4 | 81.3 | 79.5 | 80.3 | 79.6 | 80.0 |
| Run 7 Catalyst B/ Catalyst C | 79.9 | 80.7 | 80.0 | 79.6 | 80.8 | 79.8 | 79.9 | 80.1 |

| | Toluene Formation Rate g toluene/hr/g catalyst | | | | | | | |
|---|---|---|---|---|---|---|---|---|
|  | 1.5 | 2.0 | 2.5 | 3.0 | 3.5 | 4 | 4.5 | Avg. |
| Run 6 Catalyst A/ Catalyst C | 2.47 | 2.37 | 2.33 | 2.40 | 2.18 | 2.42 | 2.34 | 2.39 |
| Run 7 Catalyst B/ Catalyst C | 2.70 | 2.47 | 2.60 | 2.40 | 2.45 | 2.48 | 2.41 | 2.50 |

The $C_5^+$ liquid yield for the two runs show a slight advantage in the use of the combination of Catalyst A/Catalyst C vis-a-vis Catalyst B/Catalyst C, and the same holds true for the toluene formation rate.

It is apparent that various modifications and changes can be made without departing from the spirit and scope of the present invention, the outstanding feature of which is that the octane quality of various hydrocarbon feedstocks, inclusive particularly of paraffinic feedstocks, can be upgraded and improved.

Having described the invention, what is claimed is:

1. In a process for improving the octane quality of a naphtha in a reforming unit comprised of a plurality of serially connected reactors, inclusive of a lead reactor, a tail ractor, and one or more reactors intermediate the lead reactor and tail reactor, each of which contains a platinum-rhenium catalyst, the naphtha flowing in sequence from one reactor of the series to another and contacting the catalyst at reforming conditions in the presence of hydrogen, the improvement comprising providing the lead reactor of the series with a catalyst having a weight ratio of rhenium:platinum ranging from about 0.1:1 to about 0.5:1, providing the intermediate reactors of the series with a catalyst having a weight ratio of rhenium:platinum ranging above about 0.5:1 to about 1.2:1, and providing in the tail reactor of the series a catalyst having a weight ratio of rhenium:platinum of at least about 1.5:1.

2. The process of claim 1 wherein the weight ratio of rhenium:platinum in the catalyst of the tail reactor is at least about 2:1.

3. The process of claim 2 wherein the weight ratio of rhenium:platinum in the catalyst of the tail reactor ranges from about 2:1 to about 3:1.

4. The process of claim 1 wherein the catalyst of the tail reactor contains from about 0.01 to about 3 percent platinum.

5. The process of claim 4 wherein the catalyst of the tail reactor contains from about 0.05 to about 1 percent platinum.

6. The process of claim 1 wherein the catalyst of the tail reactor contains from about 0.1 to about 3 percent rhenium.

7. The process of claim 6 wherein the catalyst of the tail reactor contains from about 0.5 to about 1 percent rhenium.

8. The process of claim 1 wherein the catalyst of the tail reactor contains from about 0.01 to about 3 percent platinum, and sufficient rhenium to provide the expressed weight ratio of rhenium:platinum in the tail reactor.

9. The process of claim 1 wherein the catalyst of the tail reactor contains from about 0.1 to about 3 percent rhenium, and sufficient platinum to provide the expressed weight ratio of rhenium:platinum.

10. The process of claim 1 wherein the catalyst of the tail reactor contains from about 0.1 to about 3 percent halogen.

11. The process of claim 1 wherein the catalyst of the tail reactor contains from about 0.9 to about 1.5 percent halogen.

12. The process of claim 1 wherein the catalyst of the tail reactor is sulfided, and contains to about 0.2 percent sulfur.

13. The process of claim 1 wherein the catalyst of the tail reactor contains from about 0.05 to about 0.15 percent sulfur.

14. The process of claim 1 wherein the catalyst in the lead reactor of the series contains a weight ratio of rhenium:platinum ranging from about 0.3:1 to about 0.5:1, the catalyst in the intermediate reactors of the series a weight ratio of rhenium:platinum ranging above about 0.5:1 to about 0.8:1, and the catalyst in the tail reactor of the series contains a weight ratio of rhenium:platinum ranging from about 2:1 to about 3:1.

* * * * *